United States Patent [19]

Thomas, Jr. et al.

[11] Patent Number: 4,915,846

[45] Date of Patent: Apr. 10, 1990

[54] WATER CLARIFICATION

[75] Inventors: William W. Thomas, Jr., Dryden, Va.; J. David Lewis, Knoxville, Tenn.

[73] Assignee: Clean Water Technologies, Inc., Cumberland Gap, Tenn.

[21] Appl. No.: 328,057

[22] Filed: Mar. 23, 1989

Related U.S. Application Data

[63] Continuation-in-part of Ser. No. 197,230, May 23, 1988, abandoned.

[51] Int. Cl.$^4$ ................................................ C02F 1/46
[52] U.S. Cl. .................................... 210/702; 210/748; 210/917; 204/134; 204/149
[58] Field of Search ............... 210/243, 247, 748, 917, 210/702; 204/134, 149

[56] References Cited

U.S. PATENT DOCUMENTS

| | | | |
|---|---|---|---|
| 3,035,992 | 8/1962 | Hougen | 204/149 |
| 3,414,497 | 12/1968 | Kanai | 204/149 |
| 3,600,286 | 8/1971 | Sabins | 204/149 |
| 3,664,951 | 5/1972 | Armstrong | 210/748 |
| 3,915,820 | 10/1975 | Ito et al. | 204/149 |
| 4,163,716 | 8/1979 | Turnbull | 210/917 |
| 4,786,384 | 11/1988 | Gerhardt et al. | 204/149 |

FOREIGN PATENT DOCUMENTS

| | | |
|---|---|---|
| 91504 | 10/1983 | European Pat. Off. |
| 2208076 | 8/1972 | Fed. Rep. of Germany |
| 52-247426 | 12/1977 | Japan |
| 53-28959 | 3/1978 | Japan |
| 8701057 | 8/1986 | PCT Int'l Appl. |
| 566776 | 8/1977 | U.S.S.R. |
| 789436 | 12/1980 | U.S.S.R. |
| 842035 | 6/1981 | U.S.S.R. |
| 916418 | 4/1982 | U.S.S.R. |
| 1011548 | 4/1983 | U.S.S.R. |

OTHER PUBLICATIONS

"Dewatering and Densification of Coal Waste by Direct Current Laboratory Tests", Sprute et al, U.S. Bureau of Mines, 1976.

Primary Examiner—Peter Hruskoci
Assistant Examiner—Christopher Upton
Attorney, Agent, or Firm—Pitts and Brittian

[57] ABSTRACT

A water clarification apparatus (10) and method for removing dye and other organic matter from waste water within a dye lagoon (11) or other reservoir. The water clarification apparatus (10) comprises at least one first electrode (12) for being immersed in the waste water (32) within the reservoir (11), and at least one second electrode (14) for being immersed in the waste water (32) at a preselected distance from the first electrode (12). The apparatus further comprises a DC power supply means (20) to which the first and second electrodes are connected such that the first electrode defines an anode (12) and the second electrode defines a cathode (14). In accordance with the method of the present invention, the power supply means (20) is utilized to energize the anode (12) such that electrical current passes through the waste water (32) from the first electrode, or anode (12) to the second electrode, or cathode (14), causing the dye in the waste water (32) to coagulate into a precipitatable solid which can be readily removed from the waste water by conventional sewage treatment means.

7 Claims, 1 Drawing Sheet

WATER CLARIFICATION

This is a continuation-in-part application based upon parent application Ser. No. 197,230 filed May 23, 1988 now abandoned.

TECHNICAL FIELD

This invention relates to an improved water clarification method for removing dye or other organic matter from waste water. In this particular invention, the water clarification apparatus includes one or more first electrodes and one or more second electrodes connected to a DC power supply.

BACKGROUND ART

Many manufacturing processes involve the use of dyes, usually dissolved in water, for the coloring of various materials. Because of the intensive use of dyes in modern industry, clarification of the dye water waste has become a difficult problem. Current technology involves the use of a bleaching agent, usually chlorine and sometimes ozone. However, such bleaching processes tend to be quite expensive. Moreover, where chlorine is utilized as a bleaching agent, the chlorine must, in turn, be removed by other chemicals in order to comply with government regulation relating to permissible levels of chlorine in discharged waste water. Various water clarification methods have been explored for removing materials from waste water. For example, the U.S. Department of the Interior's Bureau of Mines Report of Investigation/1976, RI 8197, entitled "Dewatering and Densification of Coal Waste By Direct Current—Laboratory Tests" discloses certain exprerimental methods for clarifying and/or Dewatering coal waste water. Also representative of the water clarification art are the following patents:

| U.S. Pat. No. | Date | Country |
|---|---|---|
| 3,035,992 | May 22, 1963 | U.S. |
| 3,414,497 | December 3, 1968 | U.S. |
| 3,600,286 | August 17, 1971 | U.S. |
| 3,664,951 | May 23, 1972 | U.S. |
| 3,915,820 | October 28, 1982 | U.S. |
| 4,163,716 | August 7, 1979 | U.S. |
| 566,776 | August 1977 | USSR |
| 789,436 | December 1980 | USSR |
| 842,035 | June 1981 | USSR |
| 916,418 | April 1982 | USSR |
| 1,011,548 | April 1983 | USSR |
| 5,247,426 | December 1977 | Japan |
| 5,328,959 | March 1978 | Japan |
| 91,504 | October 1983 | Europe |
| 87/01057 | August 15, 1986 | PCT |
| 2,208,076 | September 14, 1972 | Germany |

Whereas certain of the above referenced prior art systems and methods utilize electrolysis in the removal of dye from waste water, such systems and methods tend to operate inefficiently due to the use of less than optimum current densities between anodes and cathodes, and due to the less than optimum sizing of anodes.

Therefore, it is an object of the present invention to provide an improved water clarification apparatus and method for removing dyes and other organic matter from waste water.

It is a further object of the present invention to provide an improved water clarification apparatus and method for removing dye from dye waste water which does not require the uses of bleaching agents or the introduction of other chemicals into the waste water being treated.

Yet another object of the present invention is to provide an improved water clarification apparatus which is inexpensive to manufacture, and operates at optimum efficiency utilizing preselected current densities.

DISCLOSURE OF THE INVENTION

Other objects and advantages will be accomplished by the present invention which provides a water clarification apparatus and method for removing dye and other organic matter from waste water within a dye lagoon or other reservoir. The water clarification apparatus of the present invention comprises at least one first electrode for being immersed in the waste water within the reservoir, and at least one second electrode for being immersed in the waste water within the reservoir at a preselected distance from the first electrode. The apparatus further comprises a DC power supply means to which the first and second electrodes are connected such that the first electrode defines an anode and the second electrode defines a cathode. In accordance with the method of the present invention, the power supply means is utilized to energize the anode such that electrical current passes through the waste water from the first electrode, or anode, to the second electrode, or cathode. Resultantly, the current passing through the waste water causes the dye in the water to coagulate into a precipitatable solid which can be readily removed from the waste water by conventional sewage treatment means.

BRIEF DESCRIPTION OF THE DRAWINGS

The above-mentioned features of the present invention will become more clearly understood from the following detailed description of the invention read together with the drawings in which.

BEST MODE FOR CARRYING OUT THE INVENTION

Figure 1:
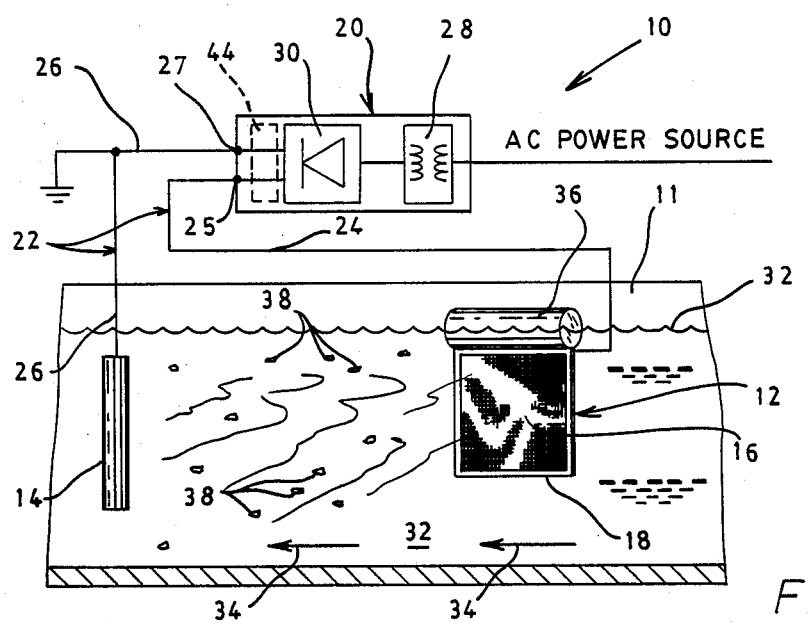
FIG. 1 illustrates a diagrammatic view of the water clarification apparatus of the present invention and the application of the associated clarification method.

A water clarification apparatus incorporating various features of the present invention is illustrated diagrammatically at 10 in the figures. The apparatus 10 and the associated water clarification method are primarily designed for removing dye from the waste water of the textile plant or other similar facility where dyes are utilized. However, it will be recognized the apparatus and process can be utilized to remove various other organic compounds which have been dissolved in water.

The water clarification apparatus 10 generally comprises one or more first electrodes 12 and one or more second electrodes 14, which, as will be discussed below, are designed to be immersed in a dye lagoon 11 or other reservoir in which the waste water is impounded. In the preferred embodiment, the first electrode 12 comprises a wire mesh screen 16 mounted in a frame 18. Although other electrode configurations can be utilized, the method of the present invention contemplates the immersion of the electrode 12 in water, and the preferred wire mesh grid configuration has been found to efficiently provide the desired electrical contact with the water and to be less disruptive of water flow within the dye lagoon or reservoir in which the electrode 12 is placed. Further, in the preferred embodiment, the electrode 12 is fabricated of stainless steel, but other durable, electrically conductive fabricating material can be utilized. In the preferred embodiment, the second electrode 14 comprises an elongated rod fabricated of copper, but as with the first electrode 12, the configuration of the electrode 14 can vary if desired and other electrically conductive fabricating materials can be utilized. For example, it has been found that a conical-shaped stainless steel mesh (not shown) serves as an efficient second electrode 14.

As illustrated in the figures, the first and second electrodes 12 and 14 are connected to a suitable direct current power supply means 20 with the circuitry means 22. More specifically, the circuitry means 22 comprises a first electrical line 24 which connects the first electrode 12 to the positive terminal 25 of the power supply means 20, and a second electrical line 26 for connecting the second electrode 14 to the negative terminal 27 of the power supply 20. It will be appreciated that by thusly connecting the electrodes 12 and 14, the first electrode 12 defines an anode, and the second electrode 14 defines a cathode. Accordingly, for convenience, the first electrode 12 will at times be referred to as the anode 12, and the second electrode 14 will at times be referred to as the cathode 14.

It is contemplated that for most applications, electrical power will be supplied by a public or private utility at standard voltages and in the form of alternating current. Therefore, in order to bring the electrical current to the desired voltage for the most efficient application of the method of the present invention, the power supply means 22 includes an isolating transformer 28; and in order to convert the alternating current supplied into direct current, the powersupply means 22 further includes a rectifier 30. By way of example, a typical application would utilize a 480 volt (100 KVA) isolating transformer, used in conjunction with a 100 KW DC rectifier. It will, however, be noted that DC voltage requirements for various applications can range from a minimum of approximately 100 volts to about 700 volts (between 80-640 amps). Thus, the specific power supply means can differ greatly with the specific application of the clarification method. Preferably, the transformer isolates the circuit, such that there is no chance stray currents will return to a ground field other than through the transformer. The preferred power source is three-phase, but single phase power can be used in smaller installations.

As indicated above, the apparatus and method of the present invention is primarily designed for removing dye from waste water, and FIG. 1 diagrammatically illustrates this particular application of the apparatus. Generally waste water 32 from the dying operation is directed into a dye lagoon 11, the direction of flow in the lagoon being indicated by the arrows 34. Normally, some dye, in the form of suspend particles, settles out; but much of the dye is dissolved in the water and will not settle out without processing. Accordingly, the anode 12 is immersed in the dye waste water 32, and, at a preselected distance downstream, the cathode 14 is immersed in the waste water 32. It will be noted that in the preferred embodiment, the anode 12 is provided with a buoyant member 36 which floats on the surface of the water 32 and holds the anode 12 in an upright position, suspended in the water. Electrical current is then supplied to the circuitry means 22 thereby energizing the anode 12. Of course, given the conductive properties of water, the current is conducted through the waste water 32 from the anode 12 to the cathode 14. And, it has been found that as a result of passing the electrical current through the dye water 32, the dissolved dye coagulates into a precipitatable solid, illustrated in the figures by the globules 38. Of course, the dye globules 38, being in precipitatable form, can be allowed to settled out in an impoundment on the dye plant site and the clarified water drained off. However, it has been found that the waste water, with the dye globules suspended therein, can be directed to a conventional sewage treatment plant for removal of the dye globules 38. In this regard, at the sewage treatment plant, the globules 38 tend to bind with the other solid waste suspended in waste water and precipitates out with such other solid waste.

Figure 2:
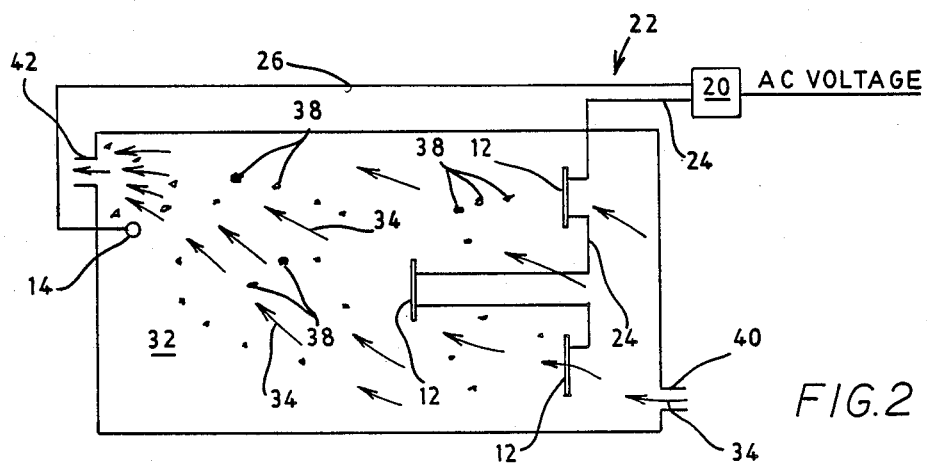
FIG. 2 illustrates a diagrammatic top view of the water clarification apparatus of the present invention as installed in a typical dye waste lagoon.
Figure 3:
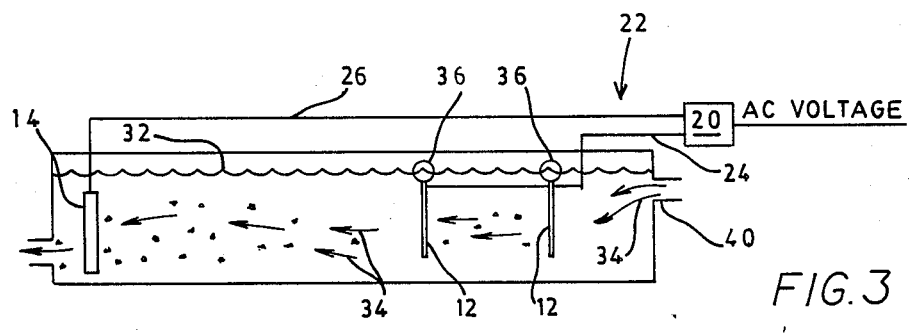
FIG. 3 illustrates a diagrammatic side elevation of the water clarification apparatus of the present invention as installed in a typical dye waste lagoon.

In FIGS. 2 and 3, a typical application of the apparatus and process of the present invention is diagrammatically illustrated by way of example. As illustrated, a dye lagoon 11 generally has an inlet 40 from which dye waste water is pumped into the lagoon 11 and an outlet 42 for draining water from the lagoon. Accordingly, the flow of waste water through the lagoon 11 is generally as indicated by the arrows 34. In this embodiment, three anodes 12 are placed in the waste water flow proximate the end of the lagoon closest the inlet 40, and a cathode 14 is placed proximate the outlet 42. As a result of such placement of electrodes, the flow of waste water passes through the electrical fields being generated between the anodes 12 and the cathode 14 causing the dye to coagulate into the globules 38. Thus, as the waste water 34 leaves the lagoon 11 through the outlet 42, the dye is in the form of a precipitatable solid which can readily be removed from the water by conventional sewage treatment means.

Of course, it will be recognized that the number and placement of the anodes and cathodes will depend upon the size and flow configurations of the specific lagoon 11 in which they are to be placed, and the embodiment of FIGS. 2 and 3 are simply illustrative of one typical application. Further, it is desirable that the total surface area of the anode(s) 12 be significantly greater than the surface area of the cathode 14. In this regard, when energized the anodes 12 give up electrons and, thus, decays during use with the rate of decomposition being dependent in large part on current density at the anode(s) and length of time energized. Therefore, in the preferred embodiment the surface area of anode(s) to cathode is approximately 98:1, thereby extending the useful life of the anodes and obviating the need for frequent replacement of anodes.

It should be noted that the globules of dye produced by the above described method tend to be of a gum-like or sludgy consistency, and the dye material tends to stick to and build up on the anodes 12 over time. In order to periodically clean the anode 12, in the preferred embodiment of the apparatus 10, the circuitry means 22 includes polarity reversing means 44 such as a suitable switching means. (See FIG. 1) The means 44 allows the current from the power supply means to be redirected such that the first electrode 12 becomes a cathode and the second electrode 14 becomes an anode.

It will be understood by those skilled in the art that during operation, gas bubbles are generated on the surface of the cathode and the turbulence resulting from the bubbling tends to break loose any sludge build-up on the cathode surface. Thus, periodically switching the first electrode 12 to a cathode allows the sludge build-up to be cleaned off of the electrodes 12. Further, automatic timing means (not shown) can be provided for automatically reversing polarity at preselected times to clean the electrodes 12.

In the application of the method of the present invention dye removal efficiency generally increases as current density between the anode(s) 12 and the cathode 14 is increased. However, it has been found that where current density is below a certain value the method tends to be inefficient and not cost effective, and where current density exceeds a certain value the increase in color removal is unjustified in view of cost. Thus, there is an optimum range of current densities within which the method is not efficient and cost effective. This range is generally an average current density between anode and cathode of between 0.00016 amps per cubic foot and 0.00128 amps per cubic foot. By way of illustration, Table 1 below sets forth test data indicative of this optimum range. Moreover, it has been found that, whereas extending the treatment period generally results in an increase in dye removal, after 24 hours of treatment a noticeable drop in removal efficiency occurs.

| RATE OF REDUCTION A.D.M.I./HR | AMPS CURRENT DENSITY PER/CUBIC FT. | CONCENTRATION | TIME FOR REDUCTION HRS | AMPERAGE | COST PER MONTH $ |
| --- | --- | --- | --- | --- | --- |
| 1 | 0.000006 | 2000 | 2000 | 3.2 | 69.12 |
| 25 | 0.00016 | 2000 | 80 | 80 | 1728 |
| 50 | 0.00032 | 2000 | 40 | 160 | 3456 |
| 75 | 0.00048 | 2000 | 26.66666 | 240 | 5184 |
| 100 | 0.00064 | 2000 | 20 | 320 | 6912 |
| 125 | 0.0008 | 2000 | 16 | 400 | 8640 |
| 150 | 0.00096 | 2000 | 13.33333 | 480 | 10368 |
| 175 | 0.00112 | 2000 | 11.42857 | 560 | 12096 |
| 200 | 0.00128 | 2000 | 10 | 640 | 13824 |
| 225 | 0.00144 | 2000 | 8.888888 | 720 | 15552 |
| 250 | 0.0016 | 2000 | 8 | 800 | 17280 |
| 275 | 0.00176 | 2000 | 7.272727 | 880 | 19008 |
| 300 | 0.00192 | 2000 | 6.666666 | 960 | 20736 |
| 325 | 0.00208 | 2000 | 6.153846 | 1040 | 22464 |
| 350 | 0.00224 | 2000 | 5.714285 | 1120 | 24192 |
| 375 | 0.0024 | 2000 | 5.333333 | 1200 | 25920 |
| 400 | 0.00256 | 2000 | 5 | 1280 | 27648 |

In light of the above, it will be appreciated that the water clarification apparatus and method of the present invention has great advantages over the prior art. The method obviates the need for expensive bleaching agents and processes. Moreover, it does not require the addition of any chemicals to the waste water which would require removal before discharge of the water into the environment or which might be discharged into the environment. Still further, because the method causes the dye to coagulate into a precipitatable solid which is removable by conventional sewage treatment means, there is no need for expensive on-site waste water impoundment facilities; and processed dye waste water can be immediately directed to a sewage treatment facility.

While a preferred embodiment has been shown and described, it will be understood that there is no intent to limit the invention to such disclosure, but rather it is intended to cover all modifications and alternate constructions falling within the spirit and scope of the invention as defined in the appended claims.

We claim:

1. A water clarification for removing dye from waste water within a reservoir, said method comprising the steps of:
    placing at least one first electrode comprising a wire mesh screen mounted in a frame within said reservoir whereby said first electrode is immersed in said waste water;
    placing at least one second electrode comprising an elongated rod of conductive metal within said reservoir a preselected distance from said first electrode, whereby said second electrode is immersed in said water, said second electrode defining a smaller surface area than said first electrode;
    connecting said first and second electrodes to a DC power supply means whereby said first electrode defines a cathode and said second electrode defines a cathode; and
    utilizing said power supply means, applying a preselected voltage to said first electrode such that electrical current passes through said waste water from said anode to said cathode, said electrical current defining a preselected average current density of between 0.00016 and 0.00128 amps per cubic foot between said anode and said cathode, whereby said electrical current passes through said water causing said dye to coagulate into a precipitatable solid.

2. The water clarification method of claim 1 wherein the ratio of the surface area of said anode to the surface area of said cathode is approximately 98:1.

3. The water clarification method of claim 1 wherein said power supply means includes transformer means for connection to an alternating current voltage source to bring said alternating current to a preselected voltage, and further includes rectifier means for changing said alternating current to direct current.

4. The water clarification method of claim 1 wherein said first electrode is fabricated of stainless steel.

5. The water clarification method of claim 1 wherein said second electrode is fabricated of copper.

6. A water clarification method of claim 1 wherein said method comprises the further step periodically redirecting said current of preselected voltage to said second electrode, whereby said second electrode defines an anode and said first electrode defines a cathode in order to clean said first electrode.

7. A water clarification method for removing dye from waste water within a dye lagoon, said dye lagoon being provided with an inlet from which said waste water flows into said lagoon and an outlet through which said waste water flows out of said lagoon, said method comprising the steps of:
    placing at least one first electrode within said lagoon so as to be immersed in said waste water and so as to intercept the flow of said waste water between said inlet and outlet of said lagoon, said first electrode having a preselected surface area;
    placing a second electrode within said lagoon proximate said outlet of said lagoon so as to be immersed in said waste water and so as to be a preselected distance from said first electrode, said second electrode having a preselected surface area, the ratio of said preselected surface area of said first electrode to said preselected surface area of said second electrode being approximately 98:1;

connecting said first and second electrodes to a DC power supply means whereby said first electrode defines an anode and said second electrode defines a cathode; and utilizing said power supply means, applying a preselected voltage to said first electrode that electrical current passes through said waste water from said anode to said cathode, said electrical current defining an average current density between said anode and said cathode of between 0.00016 and 0.00128 amps per cubic foot, whereby said electrical current passes through precipitatable solid which is carried out of said outlet.

* * * * *